United States Patent [19]

Inoue

[11] Patent Number: 4,899,182

[45] Date of Patent: Feb. 6, 1990

[54] ELECTROPHOTOGRAPHIC IMAGE FORMING APPARATUS

[75] Inventor: Motoichiro Inoue, Yokohama, Japan

[73] Assignee: Ricoh Company, Ltd., Tokyo, Japan

[21] Appl. No.: 244,910

[22] Filed: Sep. 15, 1988

[30] Foreign Application Priority Data

Sep. 18, 1987 [JP] Japan .............................. 62-142884[U]
Sep. 18, 1987 [JP] Japan .............................. 62-142887[U]
Sep. 18, 1987 [JP] Japan .............................. 62-142886[U]
Sep. 18, 1987 [JP] Japan .............................. 62-142885[U]
Jun. 15, 1988 [JP] Japan ................................... 63-147578

[51] Int. Cl.⁴ ............................................ G01D 15/00
[52] U.S. Cl. .................................. 346/153.1; 346/145

[58] Field of Search .................... 346/150, 153.1, 160, 346/154, 145, 135.1, 136; 355/200, 202; 358/300; 400/61, 67

[56] References Cited

U.S. PATENT DOCUMENTS

4,772,915  9/1988  Kando .............................. 346/153.1
4,831,393  5/1989  Dean, II et al. ................. 346/153.1

Primary Examiner—Arthur G. Evans
Attorney, Agent, or Firm—Cooper & Dunham

[57] ABSTRACT

An electrophotographic image forming apparatus includes a detachable controller cartridge in which at least a control circuit is accommodated. The detachable controller cartridge can be detachably accommodated into a housing of the image forming apparatus.

15 Claims, 6 Drawing Sheets

ELECTROPHOTOGRAPHIC IMAGE FORMING APPARATUS

BACKGROUND OF THE INVENTION

The present invention generally relates to an electrophotographic image forming apparatus such as a laser printer, a copier and a facsimile machine, and in particular to a mechanism for detachably accommodating some electronic components into a housing of the apparatus.

Currently, an electrophotographic image forming apparatus is widely used. Conventionally, an electrophotographic image forming apparatus provides a user with limited functions. In other words, such an electrophotographic image forming apparatus cannot meet various needs of the user. For this reason, it is now required to provide an electrophotographic image forming apparatus which can flexibly provide expanded or optional functions. For this requirement, components and/or units such as a main controller, a display unit such as a liquid crystal panel, an interface connection and so on, must be easily able to be accessed. This is required particularly in apparatuses provided by original equipment manufacturing. Additionally, it is advantageous that the apparatus can accept an optional unit which is designed and/or manufactured by the user. However, conventional electrophotographic image forming apparatus are not designed so as to easily access components and/or units which bring about expanded functions. In a case where access to those components or units is complex, the apparatus may be damaged or mistakenly assembled after disassembled.

SUMMARY OF INVENTION

Accordingly, a general object of the present invention is to provide an electrophotographic image forming apparatus in which the above disadvantage is eliminated.

A more specific object of the present invention is to provide an electrophotographic image forming apparatus capable of easily accessing components and/or units which must be altered or modified in order to provide expanded or optional functions and/or functions which are required by users.

The above object of the present invention is achieved by an electrophotographic image forming apparatus which includes the following elements. An optical scanning unit optically scans an image on a document. A sheet feed mechanism feeds a sheet to be printed. An image forming mechanism forms an image data to be printed from a scanned image. A print mechanism prints the image data on the sheet fed by the sheet feed mechanism. A sheet ejecting mechanism ejects a printed sheet to an ejection tray. A controller unit controls the scanning unit, sheet feed mechanism, image forming mechanism, printing mechanism and sheet ejecting mechanism so as to carry out a sequence of a printing operation. A housing of the apparatus accommodates the scanning unit, sheet feed mechanism, image forming mechanism, printing mechanism, and the sheet ejecting mechanism. A controller cartridge is detachably accommodated in a space formed into the housing for accommodating the controller unit.

Other objects, features and advantages of the present invention will become apparent from the following detailed description when read in conjunction with the accompanying drawings.

DETAILED DESCRIPTION

Figure 1:
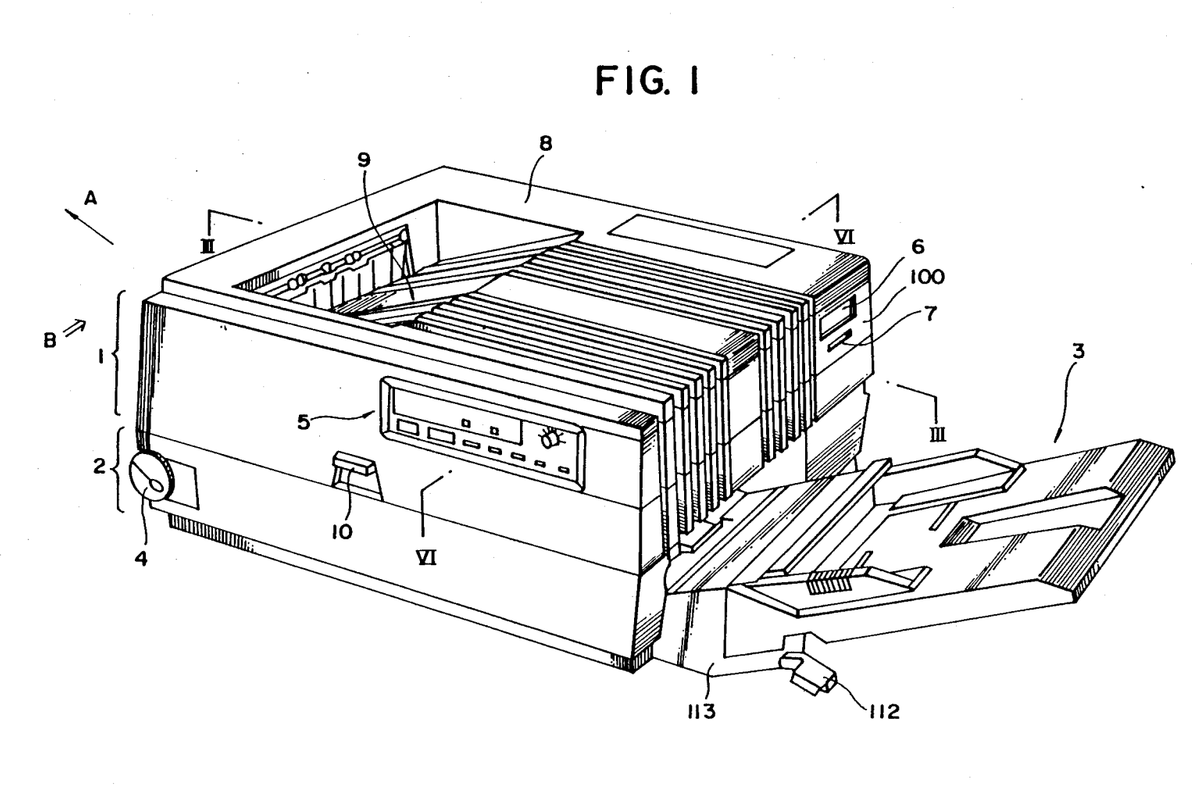
FIG. 1 is a perspective view of a laser printer which is a preferred embodiment of the present invention.

Referring to FIG. 1, a laser printer is generally composed of a printer upper unit 1 and a printer lower unit 2, both of which form a housing of the laser printer. The printer lower unit 2 is provided with a paper feed tray 3 which is detachably attached thereto for accommodating sheets of transfer paper, and a paper ejecting switching knob 4. The printer upper unit 1 can detachably accommodate a controller cartridge 100 which contains an operation display panel 5, an optional cartridge inserting entrance 6 and an optional card inserting entrance 7. The detachable controller cartridge 100 is one of the features provided by the present invention. The detachable controller cartridge 100 will be described in detail later. An upper paper ejecting tray 9 is mounted on an upper plane of a cover 8 of the printer upper unit 1.

The paper ejection switching knob 4 is used for selecting either one of two paper ejecting paths. One of them is a path on which paper which has been subjected to the printing operation is ejected towards the upper paper ejecting tray 9, and the other is a straight path on which the paper is ejected in a direction of an arrow A.

Figure 2:
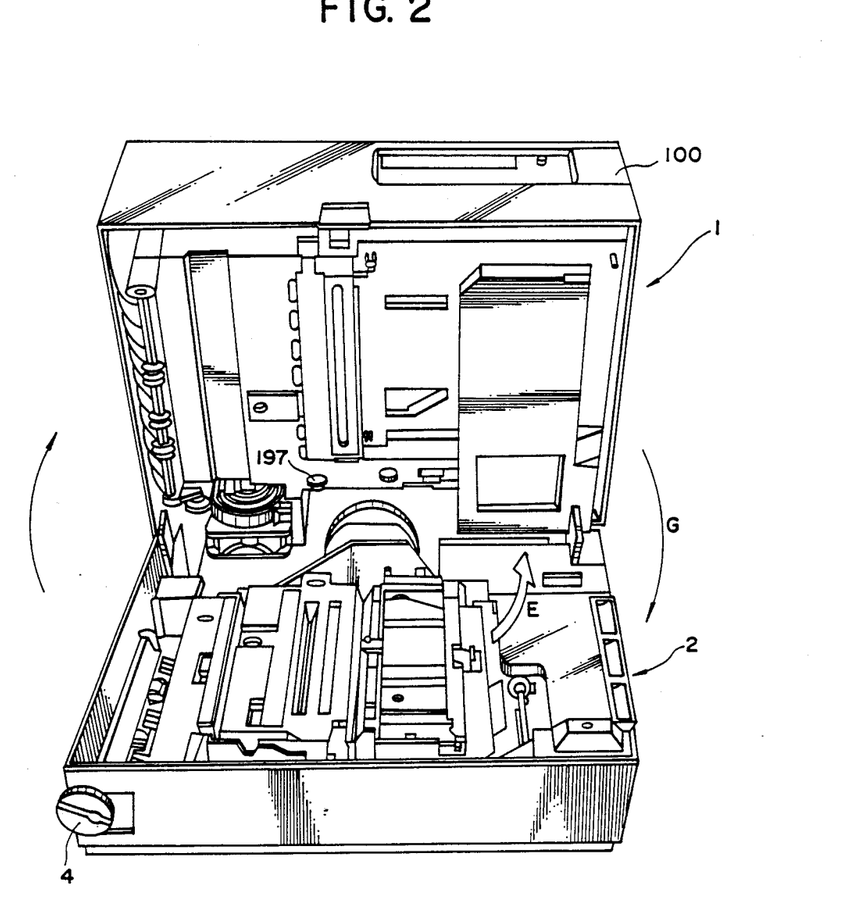
FIG. 2 is a view of the laser printer of FIG. 1 in a state where a printer upper unit is lifted.

The printer upper unit 1 and the printer lower unit 2 are hinge-coupled with each other on a rear side of the laser printer, and may be fastened to each other on a front side thereof by means of a lock mechanism. When releasing the lock mechanism by pushing up a lock lever knob 10 projecting from the front surface of the cover 8, as shown in FIG. 2, the printer upper unit 1 can pivot upwardly so as to move away from the printer lower unit 2.

Figure 3:
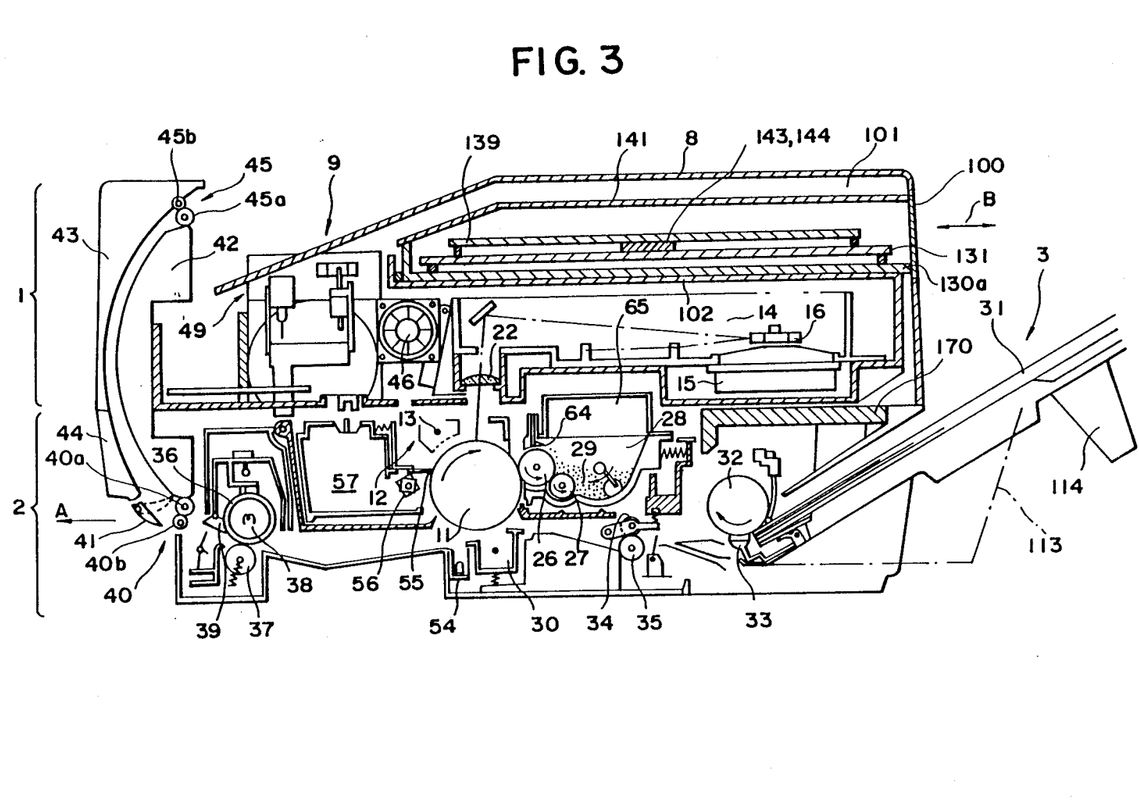
FIG. 3 is a cross sectional view taken along a line III—III shown in FIG. 1.

Referring to FIG. 3, a drum-shaped photosensitive member (hereafter referred to as a photosensitive drum) 11 located generally in the center of the printer lower unit 2 is rotated clockwise. At the commencement of the printing operation, the photosensitive drum 11 is subjected to a charge removing process carried out by a corona charger 12. A charge wire 13 in the corona charger 12 is stretched in parallel to an axis of the photosensitive drum 11, and an atmospheric electric discharge which is raised between the photosensitive drum 11 and the charge wire 13 enables a peripheral surface of the photosensitive drum 11 to be uniformly charged.

Figure 4:
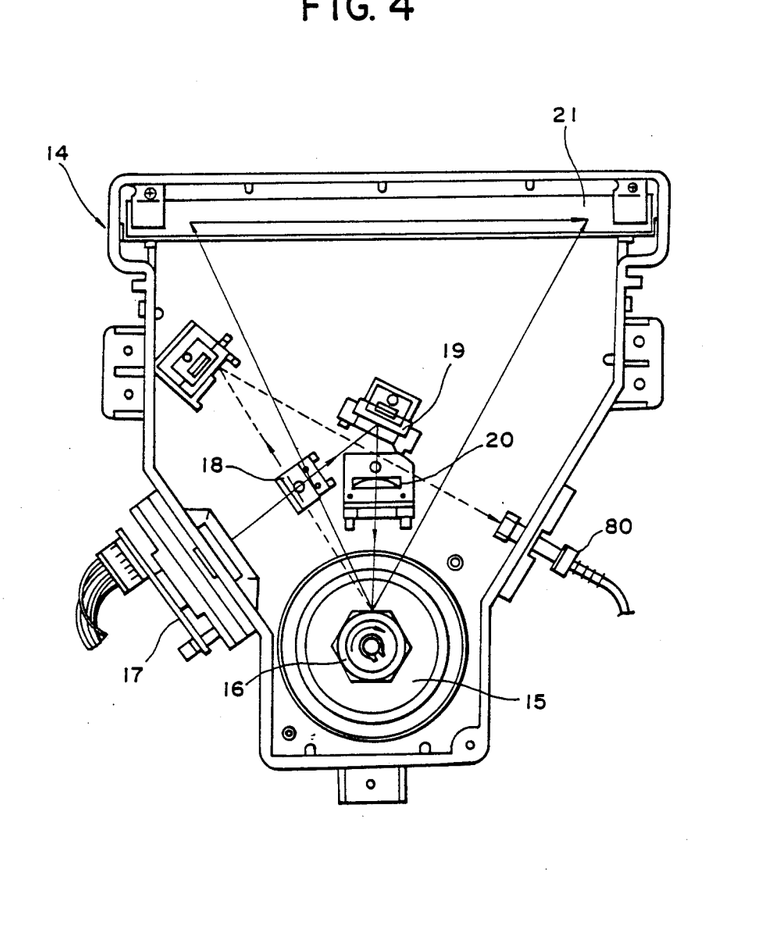
FIG. 4 is a plan view of a laser exposing unit built in the laser printer.

The photosensitive drum 11 in the charged state is then subjected to an image exposing process by a laser exposing unit 14. As shown in FIG. 4, the laser exposing unit 14 comprises a polygon mirror 16 which is rotated clockwise by a scanner motor 15, a laser diode unit (hereafter simply referred to as a LD unit) 17, a first cylindrical lens 18, a first mirror 19, a spherical lens 20 and a second mirror 21.

Figure 5:
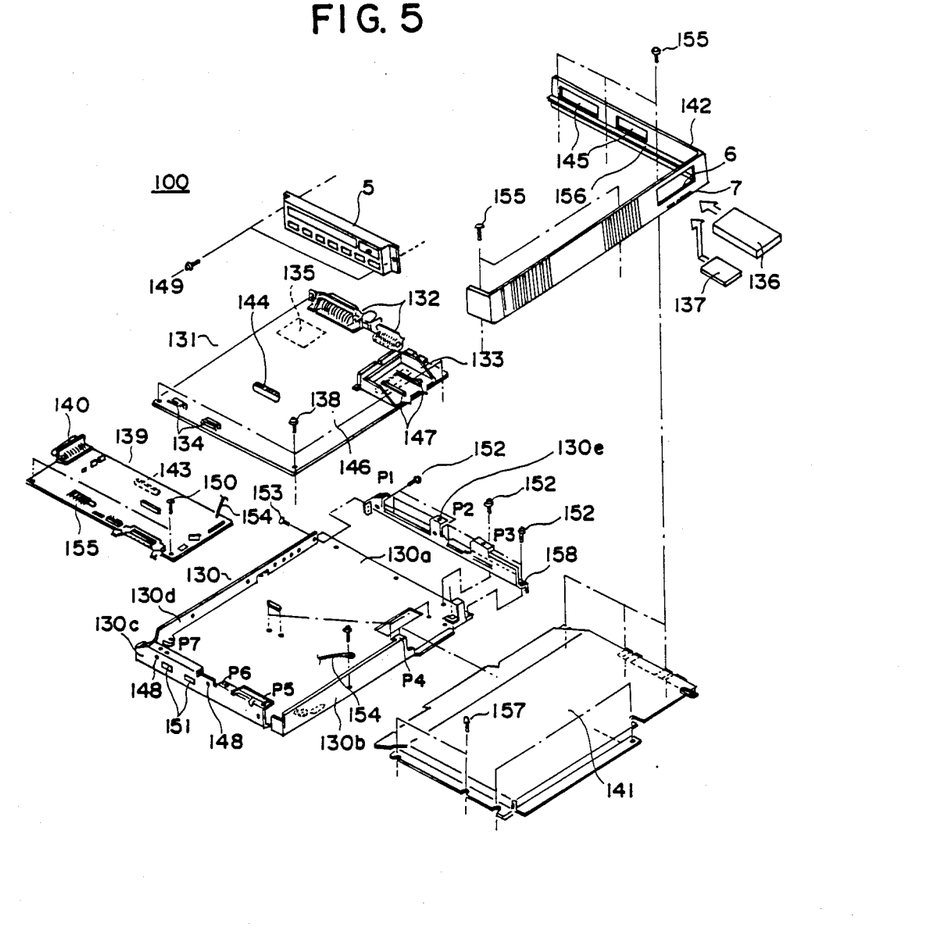
FIG. 5 is a disassembled perspective view of a controller unit which is detachably accommodated into a housing of the laser printer.

A semiconductor laser diode is built into the LD unit 17, which emits a laser beam for image signal writing in response to an image signal. As shown in FIG. 5, the laser beam passes through the first cylindrical lens 18 and the first mirror 19, and then enters the spherical lens 20. The laser beam is converged and is slightly refracted upwards by the spherical lens 20, and is then projected onto a plane of the polygon mirror 16.

Then the laser beam is reflected onto the second mirror 21, and passes through the second cylindrical lens 22, and is directed onto the photosensitive drum 11. At this time, the laser beam scans the second mirror 21, and correspondingly the photosensitive drum 11 is scanned in the main scanning direction in accordance with the rotation of the polygon mirror 16. This optical scan is repetitively carried out for every plane of the polygon mirror 16. During the optical scan, the photosensitive drum 11 is rotated in a direction orthogonal to the main scanning direction, i.e., a sub-scanning direction. As a result, an electrostatic latent image corresponding to the image signal is formed on the peripheral surface of the photosensitive drum 11.

The semiconductor laser used in the present embodiment can emit a light beam having a single wavelength of 780±10 nm at ordinary temperatures. However, generally, a sensitive range of photosensitive substance is much lower than the above value of the wavelength, and most of photosensitive substances have a peak of the sensitivity lower than a wavelength of 500 nm. Additionally, since the laser beam is coherent and has a single wavelength, multi-exposure occurs arising from light components which are reflected onto a base (made of aluminum, for example) of the photosensitive drum. This multi-exposure causes a disadvantageous effect called moire. Moreover, light energy which is received by photosensitive substance is defined by a product of the quantity of light and time. Some photosensitive substances have a property in accordance with a reciprocity law, wherein light sensitivity thereof varies by changing values of the light quantity and time even when the light energy is the same. As will be apparent from the following description, the present embodiment controls the light quantity of the light beam emitted by the laser diode, depending on a position onto which the light beam is to be projected.

In order to generate a synchronization pulse, a synchronization detecting sensor 80 detects, for every scan of the main scan, a specific position where the laser beam passes through. A synchronization clock used for controlling the image writing operation and so on is produced in response to an output signal of the synchronization detecting sensor. In FIG. 3, the electrostatic latent image formed on the peripheral surface of the photosensitive drum 11 by the laser exposing unit 14 is transferred to a developing roller 26 by the rotation of the photosensitive drum 11. The developing roller 26 is rotated counterclockwise while being kept in light contact with the peripheral surface of the photosensitive drum 11. At this time, the developing roller 26 is being supplied with toner 29 accommodated in a developing tank 28 by a toner supply roller 27, which is disposed in a bottom portion of the developing tank 28 and rotates counterclockwise. With this structure, the electrostatic latent image which is formed on the peripheral surface of the photosensitive drum 11 and has been carried up to the developing roller 26, is developed by the toner transferred by the toner supply roller 27, so that a corresponding visual image is formed.

This toner image is then transferred to a transfer position which faces a transfer charger 30. A reference numeral 64 denotes a toner layer thickness limiting blade, and 65 denotes a toner cartridge.

During the above-described process, a sheet of transfer paper which is one sheet out of stacked sheets of transfer paper 31 and is located at top thereof is separated from the other stacked sheets by a cooperative function of a paper feed roller 32 rotated in the clockwise direction and a friction pad 33 which is kept in contact with the paper feed roller 32 with a certain pressure. The separated sheet of paper is fed to a contacting part of upper and lower transportation rollers 34 and 35, and is further transported to the transfer position of the photosensitive drum 11.

The transported transfer paper is brought into contact with the toner image formed on the peripheral surface of the photosensitive drum 11 at the transfer position, and is then subjected to discharge by the transfer charger 30. The toner image formed on the photosensitive drum 11 is transferred to the transfer paper due to a function of the discharge. When the image transferring process is completed, light derived from a charge removing lamp 54 arranged next to the transfer charger 30 passes through the transfer paper and is then projected onto the peripheral surface of the photosensitive drum 11, so that a surface potential of the photosensitive drum 11 and a charge potential of the transfer paper occurring at the time when it passes over the transfer charger 30, are both weakened due to the discharging function.

The transfer paper with the potential having been weakened is separated from the photosensitive drum 11 due to its own weight, and is then fed to a heat fixing device equipped with a heating roller 36 and a pressure roller 37. A pressure is applied to both the upper and lower surfaces of the transfer paper and the toner image formed thereon by the cooperating rollers 36 and 37, while being heated by the heating roller 36, so that the toner image is solved and is fixed on the transfer paper. A heater 38 is installed in the heating roller 36 in order to heat the same.

After the toner image fixing is completed, the transfer paper is peeled from the heating roller 36 by a peeling pawl 39 and is then fed to a paper ejecting roller 40. A paper ejection switching pawl 41 is disposed at a downstream position with respect to the paper ejecting roller 40. The switching pawl 41 is used for switching between the positions indicated by a solid line and a broken line shown in FIG. 3 by turning the paper ejection switching knob 4. When the switching pawl 41 is located at the position indicated by the solid line, the transfer paper ejected from the ejection roller 40 moves along a path formed by a paper ejection guide member 42 and a paper ejection guide plate 43 and 44, and is then ejected towards the upper ejection tray 9 by the upper ejection roller 45. On the other hand, when the switching pawl 41 is located at the position shown by the broken line, the transfer paper from the paper ejection roller 40 is directly ejected in the direction of the arrow A.

Toner which did not contribute to the image transfer and still remains on the peripheral surface of the photosensitive drum 11 is discharged by a charge removing lamp 54, and is then scraped from the peripheral surface of the photosensitive drum 11 by a cleaning blade 55. The scraped toner is fed to a toner recovery tank 57 by a toner collecting roller 56. The photosensitive drum 11 which has been cleaned by the cleaning blade 55 is charged again by the corona charger 12.

The heating roller (image fixing roller) 36 is made electrically conductive in the peripheral surface thereof. The charge on the transfer paper passes through the conductive surface of the heating roller 36, and is thereby removed. The electrically conductive image fixing roller 36 may be obtained by using a carbon mixed under layer which is made of Teflon (registered trademark) or the like.

The paper feed tray 3 is detachably mounted to the printer lower unit 2. The paper feed tray 3 has an overhanging portion 113 which overhangs downwardly and is provided with a depression lever 112 (FIG. 1). A projection 114 is mounted at an rear portion of the overhanging portion 113. With this structure, the paper feed tray 3 can be more steadily and tightly attached to the printer lower unit 2, so that paper can be prevented from moving downwardly out of position. As shown in FIG. 3, an inner cover 170, loaded in a predetermined position, covers the paper feed roller 32 to prevent dust and the like from being deposited on the paper feed roller 32, and additionally to protect the paper feed roller 32 against accidental damage when lifting the printer upper unit 1.

As shown in FIG. 3, a controller accommodating space 101 is formed above an upper frame 102 of the printer upper unit 1. Below the upper frame 102, there is positioned the laser exposing unit 14. A controller cartridge 100 is detachably accommodated into the space 101. The controller cartridge 100 is manually slidable on the frame 101 of the printer upper unit 1 in a direction indicated by an arrow B shown in FIG. 3.

Referring to FIG. 5, the controller cartridge 100 has a base member 130, on which various components can be mounted. The base member 130 includes a base plate 130a and side walls 130b and 130d and a front wall 130c. A plurality of screw holes and cutout portions are formed in the base member 130. A main controller unit 131 is fixed on the base plate 130a of the base member 130 by screws 138. The main controller unit 131 has a main control circuit provided on a printed circuit board 146. The main control circuit is used for controlling electrical components of the laser printer and communicating with an external apparatus such as a host computer. Connectors 132 are mounted on a rear portion of the printed circuit board 146 of the main controller unit 131. The connectors 132 are exposed cutout windows 145 formed in an outer cover 142 having a substantially L-shaped structure. Lower portions of the connectors 132 is kept in contact with a rear wall 130e which is mounted on a detachable rear portion of the base plate 130a of the base member 130, and are thereby mechanically supported. That is, the rear wall 130e has a function of providing the printed circuit board 146 of the main controller unit 131 with a sufficient mechanical strength to thereby reinforce the printed circuit board 146. The rear wall 130e is secured on the base plate 130a and the side wall 130d by screws 152 and 153, respectively. The connectors 132, connected to a wiring pattern (not shown) formed on the printed circuit board 146, are used for connecting the laser printer to the external apparatus by a cable. Further, the main controller unit 131 has an area 135 for accommodating option memory such as a random access memory (RAM) and/or option ICs which may be attached by needs of the user.

An option unit accommodating member 133 having a slot plate is provided on a right-handed portion of the printed circuit board 146 of the main controller unit 131. The option unit accommodating member 133 can detachably accommodate an option cartridge 136 and an option card 137. An example of the option cartridge 136 is a font cartridge which stores information on the form of a character. An example of the option card 137 is an emulation card used for establishing conformity between the present laser printer and a host computer system (not shown). The option unit accommodating member 133 has projections 147 for separating an inner space thereof into an upper space and a lower space. The font cartridge 136 can be inserted into the upper space above the projections 147 through the option cartridge inserting entrance 6 which is formed in a right-handed portion of the outer cover 142. The emulation card 137 can be inserted into the lower space of the option unit accommodating member 133 through the option card inserting entrance 7 which is formed in the right-handed portion of the outer cover 142. The font cartridge 136 and the emulation card 137 are electrically connected to the main controller 131 through connectors (not shown) which are provided in the option unit accommodating member 133, the cartridge 136 and card 137. The connectors of the option unit accomodating member 133 are connected to the circuit pattern (not shown) formed on the printed circuit board 146 of the main controller unit 131.

Connectors 134 are provided on a front portion of the printed circuit board 146 of the main controller unit 131. The operation display panel 5 are mounted on and are electrically connected to the connectors 134. The operation display panel 5 are fixed to the front wall 130c of the base member 130 by screws 149. Cables or pins (not shown) from the operation display panel 5 pass through cutout windows 151 formed in the front wall 130c, and extend into the controller cartridge 100. The screws 149 engages with holes 148 formed in the front wall 130c. On the operation display panel 5, there are arranged a display such as a liquid crystal display and switches used for setting various printing conditions such as a size of transfer paper and a number of sheets to be copied.

A printer engine driver unit 139 which has an engine control circuit for controlling engine components for print as shown in FIG. 3, is fastened on the printed circuit board 146 of the main controller unit 131 by screws 150, which engages with corresponding screw holes (not shown) formed in the printed circuit board 146 of the main controller unit 131. The printer engine drive unit 139 is positioned so that a connector 143 thereof engages with a connector 144 mounted on the printed circuit board 146 of the main controller unit 131. The printer engine driver unit 139 has a connector 140 positioned on a left-handed side thereof. The connector 140 is used for establishing an electrical connection between the controller cartridge 100 and components installed in the laser printer. The printer engine driver unit 139 is electrically connected to the base plate 130a of the base member 130 by a cable 154 in order to establish common ground therebetween.

An upper cover 141 is fastened on top portions of the front wall 130c, the rear wall 130e and side walls 130b and 130d together with the outer cover 141. The upper cover 141 is secured on the rear wall 130e, the front wall 130a and the side wall 130b by screws 155 which engage with corresponding screw holes formed at positions P1 through P3 and by screws 156 which engage with corresponding screw holes formed at positions P4 and P5. Further, the upper cover 141 is secured on the front wall 130c by screws 157 which engage with screw holes formed at portions P6 and P7.

The outer cover 142 is fastened to the base member 130 by the screws 155 which are used for fastening the upper cover 141. The outer cover 142 has an inner projection 156 which extends from an inner wall of the outer cover 142 and which has through holes (now shown) through which the screws 155 pass. The screws 155 engage with corresponding screw holes which are formed in a lower flange portion 158 of the rear wall 130e and which are positioned at P1 to P3. The inner projection which extends from the inner surface of a front portion of the outer cover 142, is placed on top of the front wall 130c and the side wall 130b, and is secured together with the upper cover 141 by screws 156. The cover 141 is used for covering the main controller unit 131, the printer engine driver unit 139 and the operation display panel 5.

Figure 6:
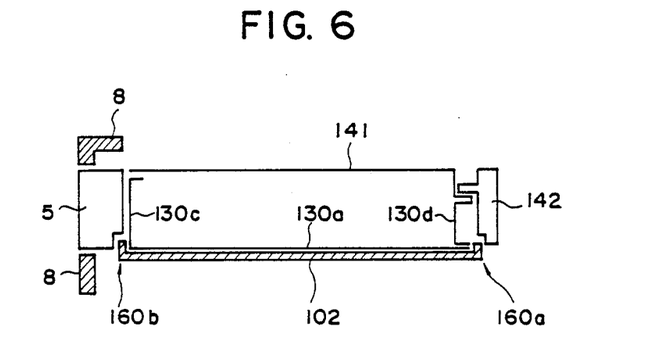
FIG. 6 is a cross sectional view taken along a line VI—VI shown in FIG. 1.
Figure 7:
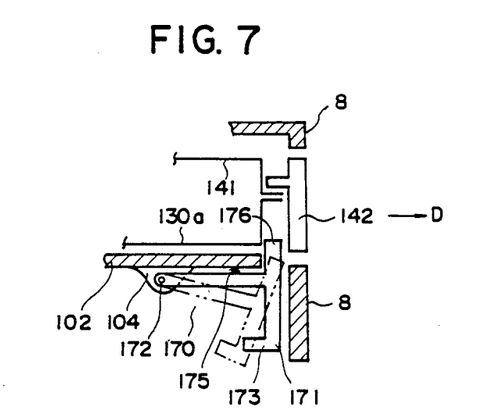
FIG. 7 is a cross sectional view showing a mechanism in the vicinity of an outer cover 142.

FIG. 6 shows a cross section taken along a line VI—VI shown in of FIG. 1. As clearly shown in FIG. 6, the controller cartridge 100 is slidable into the space 101 formed into the printer upper unit 1 along guide portions 160a and 160b which are formed on both the sides of the upper frame 102. The guide portions 160a and 160b project from an upper face of the upper frame 102. When the controller cartridge 100 is completely inserted into the printer upper unit 1, a lock mechanism 170 shown in FIG. 7 is automatically activated. The lock mechanism 170 has a lock member 171 having a substantial T-shaped cross section. The lock member 171 is rotatably supported to a supporting member 174 formed on the lower surface of the upper frame 102. That is, a pin 172 fixed to the lock member 171 is inserted into a hole formed in the supporting member 174. The lock member 171 is upwardly urged by a coil spring member 175 provided between the upper frame 102 and the lock member 171. The lock member 171 has an inclined end 176 which prevents the controller cartridge 100 from moving in a direction of an arrow D when it is placed in position. The inclined end 176 is downwardly inclined towards the outer cover 142. Therefore, when the controller cartridge 100 is inserted in the printer upper unit 1, an end of the controller cartridge 100 makes contact with and smoothly slides on the inclined end 176. When the controller unit 100 is detached from the printer upper unit 1, the paper feed tray 3 is removed and then a knob portion 173 of the lock member 171 is manually pulled down. Thereby, the lock member becomes positioned at a position shown by a broken line and the lock is thereby released.

As described above, the controller cartridge 100 can be detachably provided into the laser printer and detachably accommodate the components which contribute to providing expanded or optional functions of the laser printer such as the main controller unit 131, the printer engine unit 139, the connectors 132 for establishing a connection with an external apparatus, the option unit accommodating member 133 and the operation display panel 5. With this structure, it becomes possible to access the above components and units without difficulty and to thereby obtain expanded functions with ease. Additionally, a maintenance operation can be improved.

The present invention is not limited to the embodiment, and variations and modifications may be made without departing from the scope of the present invention. For example, units and components to be accommodated in the controller cartridge 100 are not limited to the above combination, and arbitrary combinations may be selected. Further, another unit such as the laser exposing unit 8 may be accommodated in the controller unit 100. Moreover, although the above embodiment is the laser printer, the present invention includes a copier, a facsimile and so on which are based on electrophotography.

What is claimed is:

1. An electrophotographic image forming apparatus comprising;
    scanning means for optically scanning an image on a document;
    sheet feed means for feeding a sheet to be printed;
    image forming means for forming an image data to be printed from a scanned image;
    printing means for printing the image data on the sheet fed by the sheet feed means;
    sheet ejecting means for ejecting a printed sheet to an ejection tray;
    controller means for controlling the scanning means, sheet feed means, image-forming means, printing means and sheet ejecting means so as to carry out a sequence of a printing operation;
    a housing for accommodating the scanning means, sheet feed means, image forming means, printing means, and the sheet ejecting means; and
    a controller cartridge detachably accommodated in a space formed into the housing for accommodating the controller means.

2. An electrophotographic image forming apparatus as claimed in claim 1, wherein the the controller means comprises a printed circuit board, and wherein the controller cartridge comprises a base member on which the printed circuit board of the controller means are mounted, and wherein the housing comprises a horizontal frame on which the controller cartridge is slidable.

3. An electrophotographic image forming apparatus as claimed in claim 1, wherein the controller means comprises a plurality of printed circuit boards which are mutually connected by connectors formed on the printed circuit boards.

4. An electrophotographic image forming apparatus as claimed in claim 1, wherein the controller means comprises a connector for establishing an electrical connection with an external circuit, and wherein the connector is accommodated into the controller cartridge together with the controller means.

5. An electrophotographic image forming apparatus as claimed in claim 1, further comprising display means for displaying necessary information on print, and wherein the display means is accommodated into the controller cartridge.

6. An electrophotographic image forming apparatus as claimed in claim 1, further comprising option unit accommodating means for accommodating an option unit and connecting it to the controller means, and wherein the option unit accommodating means is accommodated into the the controller cartridge.

7. An electrophotographic image forming apparatus as claimed in claim 1, further comprising lock means for locking the controller cartridge accommodated into the space formed in the housing.

8. An electrophotographic image forming apparatus as claimed in claim 2, wherein the horizontal frame of the housing comprises guide means for guiding the controller cartridge when the controller cartridge is slided on the frame.

9. An electrophotographic image forming apparatus as claimed in claim 2, wherein the controller cartridge further comprises an outer frame formed in a peripheral portion of the base member; the outer frame having a shape which matches with a shape of the housing, as well as walls provided so as to surround the printed circuit board of the controller means.

10. An electrophotographic image forming apparatus as claimed in claim 9, wherein the controller cartridge further comprises an upper cover fastened on the walls of the base member.

11. An electrophotographic image forming apparatus as claimed in claim 9, wherein the printed circuit board of the controller means comprises a connector for establishing an electrical connection with an external circuit, and wherein the outer cover comprises a cutout portion through which the connector is exposed outside the housing of the printer.

12. An electrophotographic image forming apparatus as claimed in claim 9, wherein the printed circuit board of the controller means comprises an option unit accommodating means for accommodating an option unit and connecting it to the controller means, and wherein the outer cover comprises a cutout portion through which the option unit accommodating means is exposed outside the housing of the printer.

13. An electrophotographic image forming apparatus as claimed in claim 9, further comprising display means for displaying information about print, and wherein the display means is fastened to one of the walls.

14. An electrophotographic image forming apparatus as claimed in claim 2, wherein the printed circuit board of the controller means comprises an area for accommodating an expanded random access memory.

15. An electrophotographic image forming apparatus as claimed in claim 1, wherein the outer cover and the upper cover are fastened together to the base member.

* * * * *